INVENTOR.
August H. Schutte

INVENTOR:
August H. Schutte

United States Patent Office 3,443,696
Patented May 13, 1969

3,443,696
SOLID-FLUID SEPARATING DEVICE
August H. Schutte, Lexington, Mass., assignor to Arthur D. Little, Inc., Cambridge, Mass., a corporation of Massachusetts
Filed May 1, 1967, Ser. No. 635,150
Int. Cl. B01d 33/36, 35/16
U.S. Cl. 210—297                                19 Claims

ABSTRACT OF THE DISCLOSURE

Apparatus for separating finely divided particulate material within a predetermined size range from a fluid in which it is suspended. A rotating filter within a stationary housing defines an annulus in which the fluid is rotated and from which the particles are removed through a combination of centrifugal, gravitational and fluid drag forces. The clean fluid is removed by means which permits drawing it off near the inside wall of the rotating filter assembly. A unique fluid seal is provided around the top section of the rotating filter assembly.

In many industrial processes it is often necessary to be able to handle finely divided particulate materials. For example it is often necessary to be able to clarify and filter solid particles from a fluid, i.e., a liquid or a gas, to classify fine particles within a stated size range, or to collect and concentrate a product material in finely divided form.

There are many filtering devices designed to remove particulate material from fluids. These generally consist of a filtering surface such as a fabric, or the like, through which the fluid system carrying the solids is passed and the solids collected on the filter surface. Such devices are useful in the collection of dust, and they usually have mechanisms associated with them for periodically removing the collected particulate material so that they are in effect able to operate without any extended shut-down time. While many of the drawbacks of periodic shut-downs and inefficient filtration have been solved by prior art devices there still remain serious problems not wholly solved including, for example, large space requirements, and severe wear on the filter cloth by the rubbing action of the discharge mechanisms. Moreover, most of these filtering systems are not adaptable to handling dangerous or poisonous fluids or of operating at elevated temperatures or elevated pressures.

Particle classification, or the separation of fine particles into predetermined size ranges, is now performed using wet classifiers which depend upon the difference in settling rates of the various sized particles in a liquid medium, moving screens which may be vibrated, oscillated or reciprocated, or so-called cyclone separators. The wet classifiers require the handling of a large quantity of liquid and the final separation of the fine solids by filtration followed by drying and dust collecting. Screens are limited to particle sizes over 75 microns since finer mesh sizes result in an extreme loss of capacity. Cyclone separators are limited to the separation of particles in the five to ten micron size range. They operate with a relatively high pressure drop and are incapable of delivering a sharp cut in particle size. None of these devices are capable of close classification of the small particle sizes, i.e., those below the screening range. (See for example the summary table on page 21–53 of "Perry's Chemical Engineers' Handbook," 4th edition, McGraw-Hill Book Co., Inc., New York, 1963.)

The collection of finely divided solids from a fluid system is normally carried out through the use of so-called thickeners or through various types of filter mechanisms or filtering systems. Thickeners are normally used in handling slurries which are thickened by settling, running off part of the supernatant liquid and carrying the slurry which is richer in solids to another station where it is again thickened by the process of settling or filtration.

Although each of these types of devices has been used successfully for one or more operations involving finely divided particulate matter there is a need for an apparatus which can efficiently and reliably remove fine solid particles from a fluid system, or which can make a sharp and effective separation of particle sizes or concentrate finely divided particulate material from a fluid system, whether it is a gas or liquid system.

In U.S. Patent 3,262,573 I have disclosed an improved apparatus for separating small solid particles from a fluid which includes means for feeding a solids-laden fluid into a stationary cylindrical vessel in which a rotating cylindrical filter assembly is mounted. The solid particles are forced under the pressure of the approaching flow toward or against a filter and are then subsequently thrown away from the filter assembly by centrifugal force against the inner wall of the outer cylindrical vessel. Gravity and the down flow of the feed liquid in the annulus carry these particles down for collection and removal while the clarified fluid is removed through the tubular shaft on which the filter assembly rotates. In order to minimize the slip of the fluid in the annulus defined between the rotating assembly and the filter housing, two or more baffles are positioned on the rotating filtering assembly. Up to angular velocities which result in Reynolds numbers for the rotating fluids in the annulus of between about $3 \times 10^5$ and $5 \times 10^5$ the filter of U.S. Patent 3,262,573 is capable of achieving a nonturbulent condition in the boundary layer fluid and the centrifugal separation is achieved at or near the outer stationary housing wall. In operation it has been found that by increasing the rotational speed of the vanes it is first possible to obtain an improvement in separation efficiency and then, as the speed is increased further, a sudden decrease in separating efficiencies is encountered due apparently to the introduction of turbulence in the annular fluid. It would therefore be desirable for some applications to have a filter which possesses all of the advantages gained by the apparatus of U.S. Patent 3,262,573 and the added advantages to be realized by high speed rotation, i.e., higher than is useful with the filter of U.S. Patent 3,262,573.

It is therefore a primary object of this invention to provide an apparatus capable of selectively removing solid particles from a fluid, the apparatus being reliable, relatively simple to construct and not requiring periodic shut-down to remove the solids thus collected. It is another object to provide apparatus of the character described which may be alternatively used as a device for removing fine particulate material from a fluid, as a particle separator and classifier, or as a wet scrubbing device. It is another object to provide such apparatus which is flexible in its operation and capable, through proper choice filtering media and operational conditions, of performing a variety of operations. It is a further object of this invention to provide apparatus of the character described which does not use intricate devices to continuously remove the solids collected or which because of their actions are destructive to the filter medium itself. It is yet another object to provide such apparatus which is equally well adaptable to remove finely divided solids from liquids or gases and which possesses the characteristics of being flexible in operation and adaptable to various systems. It is still a further object of this invention to provide such apparatus which does not introduce hazards or discomforts in handling hazardous, noxious or poisonous fluids. Other objects of this invention will in part be obvious and will in part be apparent hereinafter.

The invention accordingly comprises the features of construction, combinations of elements and arrangements of parts which will be exemplified in the constructions hereinafter set forth, and the scope of the invention will be indicated in the claims.

For a fuller understanding of the nature and objects of the invention reference should be had to the following detailed description taken in connection with the accompanying drawings in which FIG. 1 is a longitudinal cross section of a filter constructed in accordance with this invention;

The filter apparatus of this invention overcomes the necessity to operate below certain rotational speeds by the use of a tangential inlet to achieve the desired degree of angular acceleration of the fluid, by the elimination of the filter assembly rotating shaft as the clean fluid draw-off means, and by a unique sealing means.

It has been found that turbulent flow in the annular fluid may be avoided in the apparatus of this invention operating at higher rotational speeds than previously considered possible. This is accomplished by providing a preacceleration of the feed fluid, preferably by the use of a suitably proportioned tangential inlet. The flow of this fluid through the perforate rotating filter assembly tends to "key" the fluid to the rotor—a fact which effects a great reduction in the fluid slip. The required smooth rotation of the fluid in the annulus may be maintained if the initial angular acceleration of the fluid is sufficiently high. Under these conditions the rotational speed of the fluid in the annulus, as measured, is primarily dependent upon the speed of the rotating filter assembly. Furthermore, higher rotational speeds of the filter assembly may be utilized without encountering turbulence destructive to the centrifugal separation taking place in the annular fluid. If the tangential velocity is higher than the velocity of the fluid in the annulus adjacent to the rotating filter assembly no effect is noted. It is therefore not necessary to make any alternations for changes in fluid feed rate, at least over a very wide range of turndown.

Since the back pressure effect of the rotating filter elements depends upon the speed of rotation of the filtering element and the length of the column of fluid which is rotated, it has been found advantageous to draw off the clean fluid as far away from the shaft and as near to the inside rotor wall as is possible. Thus the perforated shaft on which the filter assembly is mounted and which serves as the fluid draw off means in the apparatus of U.S. Patent 3,262,573 has been replaced in the apparatus of this invention by an imperforate shaft. Inasmuch as the purified fluid flows outwardly through the filter assembly into a fluid withdrawal system it is necessary to provide a seal around the upper portion of the filter assembly and to adapt the filter assembly in this area for use with this seal.

Figure 1:
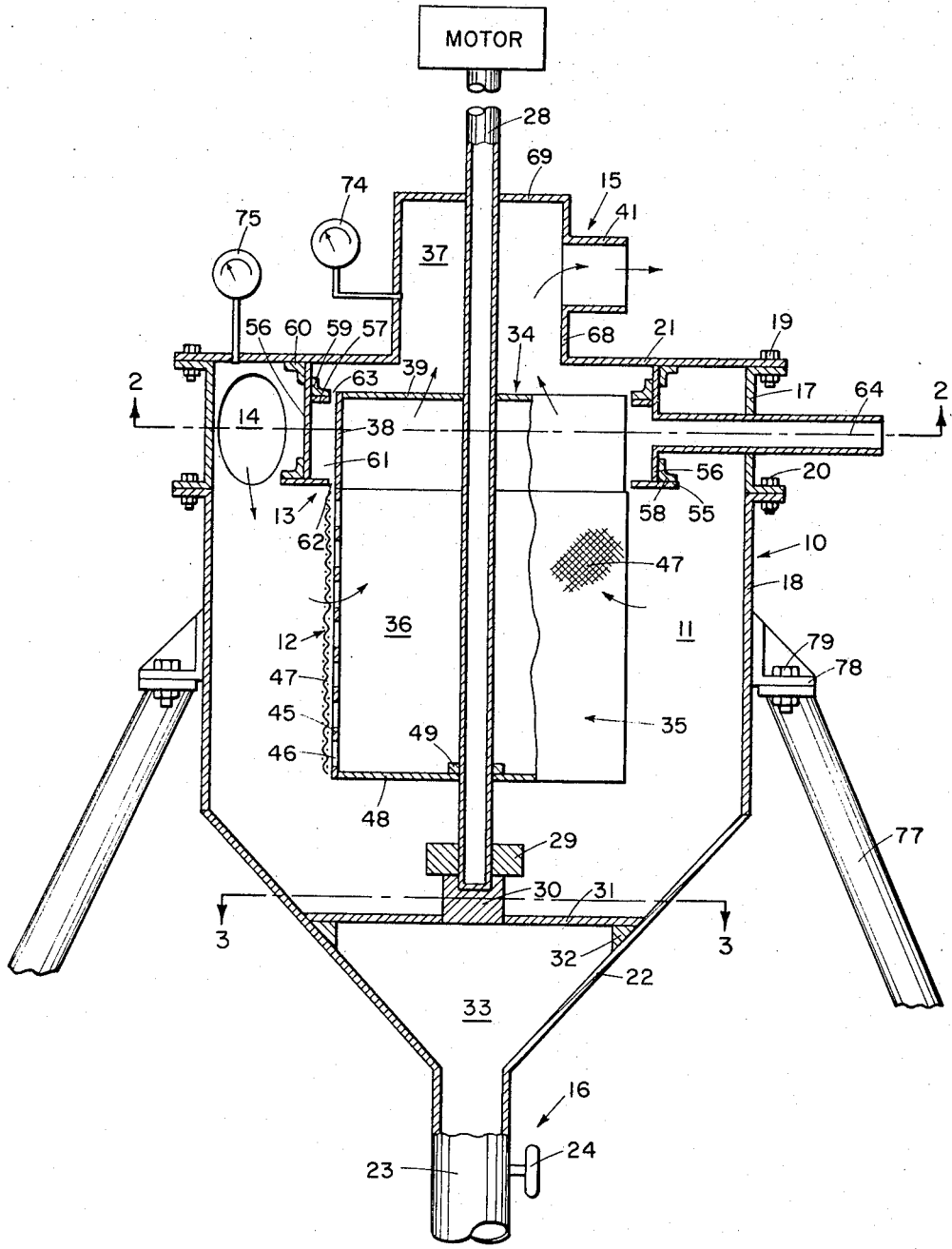

The filter of this invention is seen in FIG. 1 to be comprised of a stationary housing 10 which defines therein a housing volume 11 containing a rotating filter assembly 21 and a seal 13. The tangential fluid inlet is indicated by numeral 14 while the clean fluid withdrawal means is generally indicated by the numeral 15 and the solid withdrawal means by the numeral 16.

The housing 10 is made up of an upper cylindrical section 17, a central or main cylindrical section 18 joined to upper section 17 for convenience through flanges by means of suitable bolts 19 and 20. The upper cylindrical section 17 has a cover member 21 and the lower cylindrical section 18 terminates in a conical bottom section 22 which discharges into a solid withdrawal line 23 having a valve 24 adapted to control the discharge of the collected solids.

Figure 3:
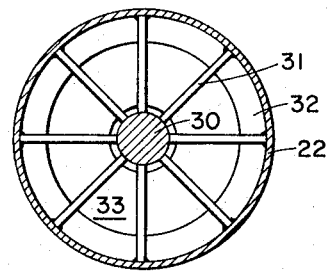
FIG. 3 is a cross section of the filter of FIG. 1 taken along line 3—3 of that figure.

The filter assembly 12 is rotated on shaft 28 which may be hollow or solid but which is not perforated and which does not enter into the fluid flow path in the filter. Suitable means such as motor M is provided for driving shaft 28 which rotates in bearing 29 supported on support member 30 held within the housing by means of suitable radial supports 31 which in turn are affixed to an annular retaining ring 32. (See FIG. 3.) The solids collect in volume 33 which is defined below the radial supports 31.

Figure 2:
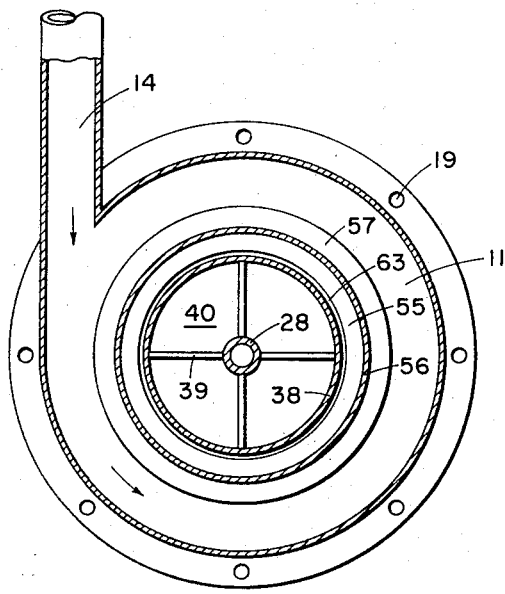
FIG. 2 is a cross section of the filter of FIG. 1 taken along line 2—2 of that figure.

The rotating filter assembly may be considered to be divided into an upper imperforate section 34 and a lower filtering section 35. Within the filtering assembly there is defined a clean fluid passage 36 which communicates with fluid passage 37 defined within the clean fluid withdrawal means 15. The upper imperforate section 34 of the filtering assembly is made up of a cylindrical wall 38 (see FIG. 2) which is supported by radial struts 39 and affixed by these to the rotating shaft 28. As will be seen from FIG. 2 the upper end of the filter assembly is open to define fluid passage 40. Thus the flow path for the "cleaned" fluid comprises the inner volume 36 of the filtering assembly, fluid passages 40, fluid passage 37 of the clean fluid withdrawal means 15 and finally the clean fluid outlet line 41 which communicates between passage 37 and a fan or pump not shown.

In the following detailed description the term "clean fluid" will be used to designate the fluid withdrawn from the filtering apparatus. It may be essentially completely free from all solids if the purpose of the apparatus is to remove all solids; or it may contain particulate material sized finer than a certain predetermined maximum if the apparatus is to serve as a classifier or as one stage in a classifier. The term "filtering surface" is used to designate the porous material mounted on the lower filtering section 35 of the rotating filter assembly 13. As will become apparent in the discussion to follow, the filtering surface may be of a wide variety of materials and the term is not limited to a foraminous material defining passages which are of necessity smaller than the particles to be removed from the fluid. Thus the term "filtering surface" is used in a broader than normal sense in that its role may or may not be to catch, entrap or hold particles as a screen or cloth would normally do.

The bottom or filtering section 35 of the rotating filter assembly 13 is formed of a coarse foraminous cylinder 45 which has relatively large openings 46. On the coarse foraminous cylinder 45 a finer porous material is mounted to form a filtering surface 47. This filtering surface may be a wide variety of material including wire cloth or screen, a filtering material such as a pulverant material capable of being suspended by a wire mesh, size-classified fibers suitably bonded together, a napped material such as felt, a glass fiber material, so-called "high efficiency" filter paper (see U.S. Patent 2,791,907) or any other suitably porous material capable of permitting the passage of the fluid being handled. The filtering surface will of course be chosen to be compatible with the fluid, the particulate material and the ultimate purpose of the filter. As pointed out previously the openings in the filter surface may be larger than the diameter of the particles which are to be removed from the fluid. For example under controlled conditions a 200-mesh (75 micron) screen will allow no particles larger than 2 microns to pass through the filter assembly. If the volume of fluid, and thus, the approach velocity is increased the size of the rejected particles increases until it finally equals the mesh opening of the filtering medium and a layer of the particles is deposited. Thus by controlling the fluid flow rate and the rotational speed of the rotating filter assembly it is possible to control the size of the rejected particles over a wide range without making any change in the pore size of the filtering surface.

The filtering assembly (FIG. 1) is closed at the bottom with an end member 48 and is aligned and supported on the lower end on the rotating shaft 28 through a suitable ring 49.

The back pressure effect of the rotating filter assembly depends upon the r.p.m. of the assembly and on the length of the column of fluid which is rotated, i.e., the radial distance from the wall of the outer stationary housing 18 to the drawoff at the inner surface of the rotor 35. It is therefore advantageous to draw off the clean fluid as far away from the shaft 28 and as near to the inside assembly wall defining volume 36 as possible. This necessitates providing the sealing means 13 at the full diameter of the rotating filter assembly and more precisely around the upper imperforate portion of the filter assembly. This sealing means provides a clean pressurized atmosphere around the upper or imperforated section 34 of the rotating filter assembly. The pressure of fluid within this seal is maintained at a somewhat higher value than the fluid pressure obtaining within volume 11 of the filter and also within the clean fluid outlet system 15.

In the apparatus of FIG. 1, the pressurized region is provided around imperforate section 34 of the filter assembly by means of seal defining walls which provide for close but not fluid-tight clearances with cylindrical member 38 forming the imperforate section of the rotating filter assembly. The components making up the seal of this filter are an annular bottom plate 55, a vertical cylindrical wall 56, and an annular top ring 57. These components are joined to each other and to the cover member 21 of the filter housing by means of angled joining ring members 58, 59 and 60. The seal defines an annular volume 61 around the upper or imperforate section 34 of the rotating assembly. Between the bottom ring plate 55 and the cylindrical wall 36 of the upper section of the rotating filter is a small clearance 62; and likewise between the upper ring 57 and the upper section of the cylindrical wall 38 there is provided a small clearance 63. Fluid under pressure is admitted into the seal volume 61 through a suitable fluid conduit 64. The fluid used in the seal may be a portion of the clean fluid withdrawn through line 41 and compressed prior to its introduction through line 64 into seal volume 61. In the case where air is used as the fluid and the filtering apparatus is mounted in the suction of an exhaust fan, the in leakage of ambient air may suffice as a suitable source of fluid for the seal.

The clean fluid withdrawal means is defined by a cylindrical wall 68 having a cover 69 and it is in fluid communication 41 with the suction side of a fan or pump not shown. One pressure gage 74 is associated with the clean fluid withdrawal means 15 and another gage 75 is associated with the inner volume of the filter.

The entire filter apparatus is conveniently supported by legs 77 which are shown only partially. Legs 77 are attached to the filter housing through suitable flanges 78 and screws 79.

Figure 4:
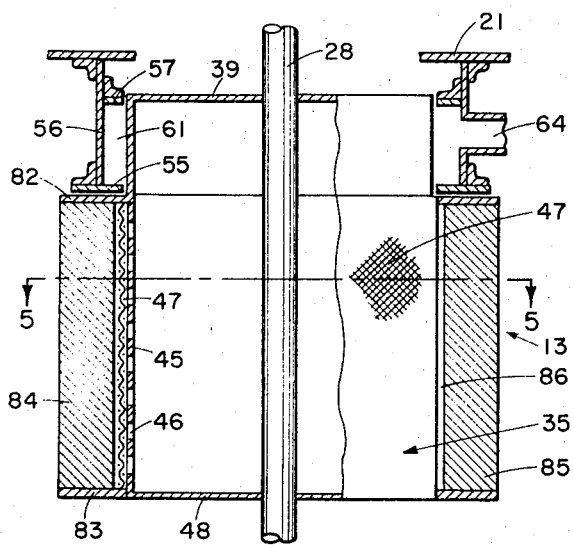
FIG. 4 is a longitudinal cross section of the rotating filter assembly of this invention showing the use of baffles.
Figure 5:
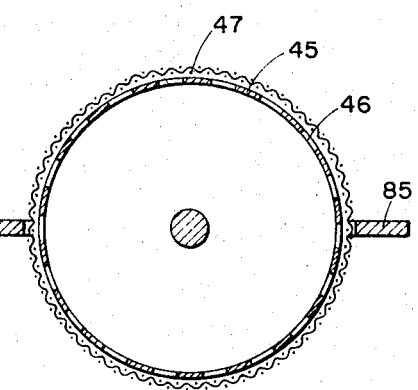
FIG. 5 is a cross section of the rotating filter assembly of FIG. 4 taken along line 5—5 of that figure.

Although the filter of this invention may operate satisfactorily without the use of baffles such as those disclosed in U.S. Patent 3,262,573 it is possible to incorporate baffles on the rotating filter assembly when their use is indicated as illustrative in FIG. 4. In this drawing like numerals refer to similar components shown in FIGS. 1–3. Extending out from the top portion of the perforated filter section 35 is a holding lug 82. A similar lug 83 is placed at the bottom of the filtering assembly and positioned between these are two baffles 84 and 85 which define with the surface of the filter an annular space 86.

Figure 6:
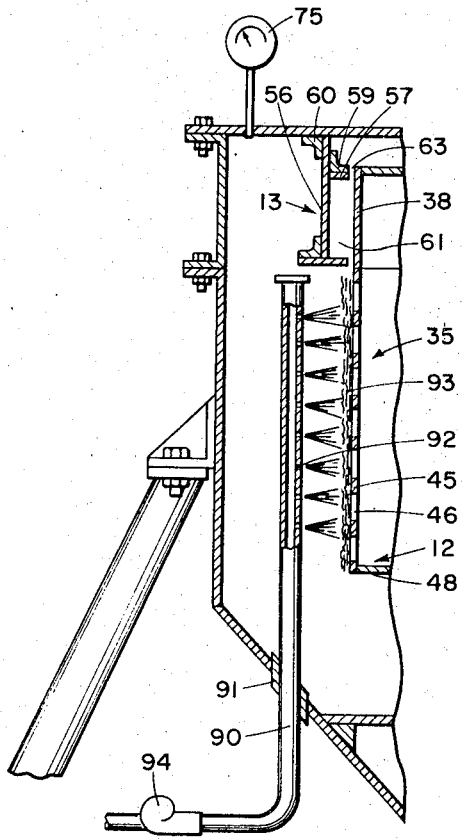
FIG. 6 is a longitudinal cross section through one side of the filter showing the incorporation of a filter washing means.

FIG. 6 illustrates a modification of the filter of this invention to convert it to a wet scrubbing device for gases or fumes. One or more liquid conduits are arranged to direct liquid under pressure against the filtering surface. In the partial cross section of FIG. 6 a pipe 90 is inserted through conical section 22 with the use of a suitable seal 91 to maintain the housing fluid-tight. The pipe 90 is capped at the upper end and has apertures or nozzles 92 directed to face the filtering surface 93 of the rotating assembly. Fluid under pressure is introduced into pipe 90 by means of a suitable pump 94 and is caused to impinge on filtering surface 93 which is illustrated in FIG. 6 to be a relatively thick (for example about one-quarter to one and one-half inches) glass fiber bat. By adjusting the discharge velocity of the liquid from pipe 90 and the speed of rotation of the filter assembly, the wash liquid may be made to impinge on the filtering surface and penetrate with violet slippage into the filtering surface while being suddenly accelerated. Subsequent to this acceleration, the wash liquid is thrown off the rotating filter, carrying accumulated solids with it. This mechanism produces a very thorough scrubbing action on the gas by subjecting it to contact with a large amount of wetted surface and eliminating the collected solid particles without presenting a high pressure drop and without risking entrainment of wash liquid in the exit gas.

Figure 7:
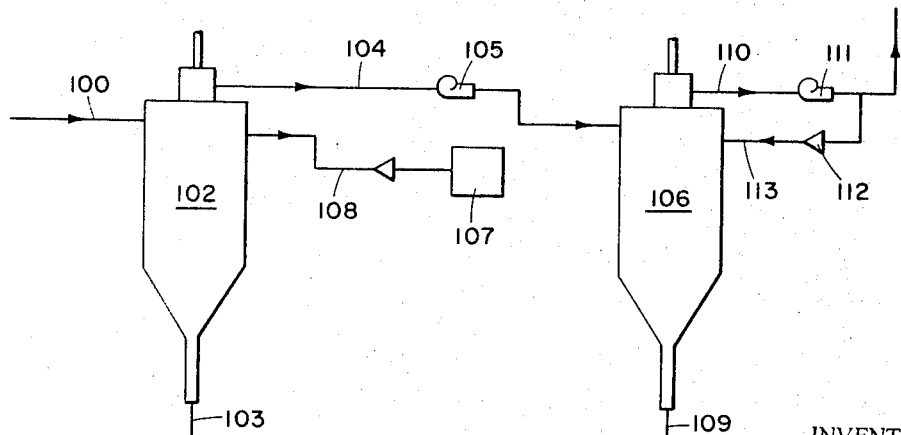
FIG. 7 illustrates the use of the filter of this invention in a particle classifying apparatus.

FIG. 7 illustrates the use of two of the separators of this invention as a classifier. To illustrate (but not limit) this use of the device for air classification of fine solids assume that a first separator 102 is to remove particles larger than 5 microns. This may be done by employing a screen having a mesh size between 50 and 200, its function being to provide diffuse flow of the air throughout the annulus. No solids accumulate on the screen and therefore the pressure drop is low. The solids to be classified are suspended in an air stream in line 100 induced by fan 105. Particles larger than 5 microns are withdrawn through line 103; and the "clean" fluid taken out through conduit 104 to fan 105 is introduced into a second separator 106. Pressurized fluid for the seal is supplied from a separate source 107 through line 108 or directly from the ambient air. In the filtering surface of separator 106 is a "high efficiency" filter paper or the equivalent, particles ranging in size from about 5 microns down to several millimicrons may be removed and discharged from the filter through line 109. The clean fluid is withdrawn from filter 106 through line 110 by fan 111 and a portion of it is then compressed in fan 112 to be returned via line 113 into the sealing system of filter 106. A portion of this fluid may also be used in the sealing system of filter 102 serving as the separate fluid source 107. The air flow may be forced through the system by a fan or fans instead of drawn through as in this example.

The following examples are given to illustrate the performance of the filter of this invention. The operation of this filter is not limited, of course, to the operational parameters given in these examples which are offered only for illustration.

The apparatus of FIG. 1 was used to evaluate its ability to remove fine sand and fly ash from air. In one series of runs a 200-mesh screen (75 micron openings) was used as the filtering surface 47 of the rotating filter assembly. Sand which passed a 200-mesh sieve, i.e., had a maximum diameter of 75 microns was suspended in air which was introduced into the filter at 600 and 1200 cubic feet per minute. The filter assembly (area 10 square feet) was rotated at 540 revolutions per minute. When the air flow rate was 600 c.f.m. the pressure drop was 1.3 inches of water and sand recovery was 97% by weight; and when the air flow rate was 1200 c.f.m. the pressure drop was 1.5 inches of water and sand recovery was 99%+ by weight. When the baffles were used (see FIG. 4) the sand recovery dropped off when the r.p.m. was increased above about 450.

Using the same screen and operating conditions, the filter was tested with fly ash from a public utility. The fly ash ranged in size between about 1 to 50 microns, approximately 4% by weight being less than 3.5 microns. The largest particles in the exit air at an air flow rate of 600 c.f.m. were 3.5 microns with an inlet-outlet pressure drop of 1.3 inches of water; and at 1200 c.f.m. the cut was at 2 microns with a pressure drop of 1.5 inches of water.

These data in the examples given illustrate the fact that a filtering surface having openings considerably larger than the maximum dimensions of the particles to be removed is effective. There was no visible evidence of particle build-up. From such performance data it will be seen that the device of this invention exhibits separation efficiencies on fly ash which are superior to those achieved by a large single cyclone separator, or even a multi-clone installation and that it experiences a lower pressure drop than these widely used devices. Moreover, the performance of this filter compares favorably in many practical applications with that of an electrostatic precipitator. Finally, it will exhibit a degree of abrasion which is less than that of multi-clones due to the lower g velocities and forces at the inlet zone. Also any abrasion which is experienced will be located in one or two places which are easy to reach.

The uniform flow conditions present in the annulus of this filtering apparatus operating with a bare screen as the filtering surface on the rotating filter assembly will not effectively separate particles smaller than one to two microns in the absence of agglomeration because the inertial and drag forces of particles in this size range are almost the same as their apparent weight in the centrifugal field. Under these circumstances it is preferable to resort to a truly retentive filter medium, such as "high efficiency" filter paper, gas mask liner paper, etched screens or the equivalent, as the filtering surface. The r.p.m. of the filter assembly and the fluid flow rate through the filter is adjusted so as to operate either in equilibrium with a constant, very thin, layer of particles on the filtering surface, or to spin off any accumulation of solids merely by reducing the air flow when necessary. This type of operation was proven by making runs with 50-50 mixtures of industrial fly ash (1-50 microns with about 4% by weight being less than 3.5 microns) and a very fine pigment grade of line. The filtering surface was "high efficiency" filter paper (7.5 square feet), the rotor speed was 540 r.p.m., the fluid feed rate 200 c.f.m. and the pressure drop was 4.8 inches of water. After every twenty to thirty minutes' operation the air flow rate was decreased for ten seconds to eliminate the pressure drop build-up. The particle layer on the filter paper surface was completely white, indicating the very efficient degree of fine particle classification since the fly ash was nearly black while the finer lime particles were, of course, white.

The same filtering surface was used to test the effectiveness of the device in removing carbon black particles having a particle size average of just under 5000 A. (0.5 micron) from air. This gave an air rate (for 7.5 square feet) of 250 to 130 c.f.m. over a cycle time of 15-20 minutes with an end cycle pressure drop of 4.9 inches of water. Under these operational conditions 99%+ of the carbon black was retained.

It will be apparent from the above description and examples that the filter apparatus of this invention may be used in a number of ways in which fine particulate materials are to be removed, scrubbed or classified. By proper choice of fluid flow rate, filter assembly rotational speed, and filtering surface it is possible to achieve great flexibility in its use.

I claim:

1. A filtering apparatus for removing solid particles from a fluid, comprising in combination
   (a) a pressure-tight, stationary housing including an upper cylindrical section closed by a cover member;
   (b) clean fluid withdrawal means in fluid communication with a central opening in said cover member;
   (c) a rotatable filter assembly having a cylindrical filtering surface and an internal fluid passage and being mounted on a vertical axis within said housing thereby to define with the inner wall of said housing an annulus adapted through its configuration to control the flow and motion of said solid particles within the fluid in said annulus, said filter assembly comprising, in combination
      (1) a lower filtering section having a filtering surface through which clean fluid passes into said internal fluid passage,
      (2) an upper imperforate section being an extension of and essentially the same diameter as said lower filtering section and providing fluid communication with said fluid withdrawal means through said central opening, and
      (3) a shaft adapted to rotate said filter assembly;
   (d) a fluid seal surrounding said upper imperforate section of said filter assembly and comprising a stationary seal housing which defines around said imperforate section a fluid chamber, said seal housing being adapted to allow leakage of sealing fluid into said cylindrical section of said housing and into said fluid withdrawal means;
   (e) means for introducing said sealing fluid into said fluid seal at a pressure slightly in excess of the fluid pressure obtaining within said housing; and
   (f) fluid inlet means above said filtering section of said filter assembly and positioned to introduce fluid containing suspended solid particles into the upper end of said cylindrical section of said housing with a tangential velocity sufficient to minimize fluid slip between the fluid in said annulus and said filtering member as it rotates, thereby to maintain substantially non-turbulent conditions in said fluid in said annulus, said fluid inlet means being so positioned with respect to said lower filtering section as to cause the flow of said fluid in said annulus to be radially inward and axially downward; and
   (g) means for removing accumulated solids from the lower end of said housing.

2. A filtering apparatus in accordance with claim 1 wherein said fluid inlet means is a tangential inlet nozzle adapted to impart to the fluid within said annulus a predetermined angular acceleration.

3. A filtering apparatus in accordance with claim 1 wherein said rotatable filter assembly has at least two vertically positioned baffle plates mounted on said filter assembly, rotatable therewith and uniformly spaced around and away from said filtering surface.

4. A filtering apparatus in accordance with claim 1 wherein said filtering surface is a wire screen.

5. A filtering apparatus in accordance with claim 1 wherein said filtering surface is a high efficiency filter paper.

6. A filtering apparatus in accordance with claim 1 wherein said filtering surface is a fabric.

7. A filtering apparatus in accordance with claim 1 wherein said filtering surface is formed of glass fibers.

8. A filtering apparatus in accordance with claim 1 wherein said filtering surface is a napped material.

9. A filtering apparatus in accordance with claim 1 wherein said means for introducing said fluid into said fluid seal comprises means for compressing a portion of said clean fluid withdrawn from said filter and returning the compressed fluid to said seal.

10. A filtering apparatus in accordance with claim 1 wherein said means for introducing said fluid into said fluid seal comprises conduit means providing fluid communication between ambient air and said fluid chamber of said seal.

11. A wet scrubbing apparatus comprising in combination
(a) a pressure-tight, stationary housing including an upper cylindrical section closed by a cover member;
(b) clean fluid withdrawal means in fluid communication with a central opening in said cover member;
(c) a rotatable filter assembly having a cylindrical filtering surface and an internal fluid passage and being mounted on a vertical axis within said housing thereby to define with the inner wall of said housing an annulus adapted through its configuration to control the flow and motion of said solid particles within the fluid in said annulus, said filter assembly comprising, in combination
  (1) a lower filtering section having a filtering surface through which clean fluid passes into said internal fluid passage,
  (2) an upper imperforate section being an extension of and essentially the same diameter as said lower filtering section and providing fluid communication with said fluid withdrawal means through said central opening, and
  (3) a shaft adapted to rotate said filter assembly;
(d) a fluid seal surrounding said upper imperforate section of said filter assembly and comprising a stationary seal housing which defines around said imperforate section a fluid chamber, said seal housing being adapted to allow leakage of sealing fluid into said cylindrical section of said housing and into said fluid withdrawal means;
(e) means for introducing said sealing fluid into said fluid seal at a pressure slightly in excess of the fluid pressure obtaining within said housing;
(f) fluid inlet means above said filtering section of said filter assembly and positioned to introduce fluid containing suspended solid particles into the upper end of said cylindrical section of said housing with a tangential velocity sufficient to minimize fluid slip between the fluid in said annulus and said filtering member as it rotates, thereby to maintain substantially nonturbulent conditions in said fluid in said annulus, said fluid inlet means being so positioned with respect to said lower filtering section as to cause the flow of said fluid in said annulus to be radially inward and axially downward;
(g) means for directing a wash liquid under pressure against said filtering surface with a force such that said wash liquid penetrates into said filtering surface and is then discharged therefrom through centrifugal force; and
(h) means for removing said wash liquid and solids from the lower end of said housing.

12. A wet scrubbing apparatus in accordance with claim 11 wherein said filtering surface is a thick glass fiber bat.

13. A finely divided particulate material classifier, comprising in combination at least two filters connected in series whereby the succeeding filter in said series receives filtered fluid from the preceding one as fluid feed, each of said filters comprising
(a) a pressure-tight, stationary housing including an upper cylindrical section closed by a cover member;
(b) clean fluid withdrawal means in fluid communication with a central opening in said cover member;
(c) a rotatable filter assembly having a cylindrical filtering surface and an internal fluid passage and being mounted on a vertical axis within said housing thereby to define with the inner wall of said housing an annulus adapted through its configuration to control the flow and motion of said solid particles within the fluid in said annulus, said filter assembly comprising, in combination
  (1) a lower filtering section having a filtering surface through which clean fluid passes into said internal fluid passage,
  (2) an upper imperforate section being an extension of and essentially the same diameter as said lower filtering section and providing fluid communication with said fluid withdrawal means through said central opening, and
  (3) a shaft adapted to rotate said filter assembly;
(d) a fluid seal surrounding said upper imperforate section of said filter assembly and comprising a stationary seal housing which defines around said imperforate section a fluid chamber, said seal housing being adapted to allow leakage of sealing fluid into said cylindrical section of said housing and into said fluid withdrawal means;
(e) means for introducing said sealing fluid into said fluid seal at a pressure slightly in excess of the fluid pressure obtaining within said housing;
(f) fluid inlet means above said filtering section of said filter assembly and positioned to introduce fluid containing suspended solid particles into the upper end of said cylindrical section of said housing with a tangential velocity sufficient to minimize fluid slip between the fluid in said annulus and said filtering member as it rotates, thereby to maintain substantially nonturbulent conditions in said fluid in said annulus, said fluid inlet means being so positioned with respect to said lower filtering section as to cause the flow of said fluid in said annulus to be radially inward and axially downward; and
(g) means for removing accumulated solids from the lower end of said housing; the filtering surface of each of said succeeding filters being adapted to remove particles of a smaller size range than the filtering surface of said preceding filter.

14. A classifier in accordance with claim 13 wherein the filtering surface of one of said filters is a screen and the filtering surface of the succeeding filter is high efficiency filter paper.

15. A filtering apparatus for removing solid particles from a fluid, comprising in combination
(a) a pressure-tight, stationary housing including an upper cylindrical section and defining a fluid-tight chamber;
(b) fluid withdrawal means in fluid communication with said chamber;
(c) a rotatable filter assembly having a cylindrical filtering surface and an internal fluid passage and being mounted on a vertical axis within said chamber thereby to define with the inner wall of said housing an annulus adapted through its configuration to control the flow and motion of said solid particles within the fluid in said annulus, said filter assembly comprising in combination
  (1) a lower filtering cylindrical section having a filtering member through which said fluid passes into said internal fluid passage,
  (2) an upper imperforate cylindrical section being an extension of and essentially the same diameter as said lower filtering section and defining fluid communication means between said internal fluid passage and said fluid withdrawal means,
  (3) an imperforate shaft adapted to rotate said filter assembly;
(d) fluid inlet means above said filtering section of said filter assembly and positioned to introduce fluid containing suspended solid particles into the upper end of said cylindrical section of said housing with a tangential velocity sufficient to minimize fluid slip between the fluid in said annulus and said filtering member as it rotates, thereby to maintain substantially nonturbulent conditions in said fluid in said annulus, said fluid inlet means being so positioned with respect to said lower filtering section as to cause the flow of said fluid in said annulus to be radially inward and axially downward; and (e) means for removing accumulated solids from the lower end of said housing.

16. A filtering apparatus in accordance with claim 15 wherein said rotatable filter assembly has at least two vertically positioned baffle plates mounted on said filter assembly, rotatable therewith and uniformly spaced around and away from said filtering member.

17. A filtering apparatus in accordance with claim 15 wherein said filtering member has openings larger than the diameter of the smallest particles to be removed from said fluid.

18. A filtering apparatus in accordance with claim 15 wherein said filtering member is a high efficiency filter paper.

19. A filtering apparatus in accordance with claim 15 further characterized by having fluid sealing means associated with said upper imperforate section of said filter assembly and adapted to maintain around at least part of said upper imperforate section a pressure slightly in excess of the fluid pressure obtaining within said housing.

References Cited

UNITED STATES PATENTS

| | | | |
|---|---|---|---|
| 844,438 | 2/1907 | Bayley | 210—252 |
| 2,569,567 | 10/1951 | Korn | 55—408 X |
| 2,678,733 | 5/1954 | Reeves | 210—391 X |
| 2,994,406 | 8/1961 | Hemeon | 55—242 |
| 3,262,573 | 7/1966 | Schutte | 210—380 |

FOREIGN PATENTS

| | | |
|---|---|---|
| 216,529 | 8/1961 | Austria. |
| 649,142 | 9/1962 | Canada. |

REUBEN FRIEDMAN, *Primary Examiner.*

J. L. DE CESARE, *Assistant Examiner.*

U.S. Cl. X.R.

55—242, 408; 210—304, 391